United States Patent
Isom et al.

(10) Patent No.: US 6,426,102 B1
(45) Date of Patent: *Jul. 30, 2002

(54) SHREDDED CHEESE

(75) Inventors: Lowell Isom, St. Louis, MO (US); David Webb Mehnert, Lake Villa; Nicole Grabowski, Chicago, both of IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/618,514

(22) Filed: Jul. 18, 2000

(51) Int. Cl.$^7$ ................................................ A23L 1/30
(52) U.S. Cl. ......................... 426/72; 426/73; 426/335; 426/518; 426/532; 426/580; 426/582
(58) Field of Search ............................ 426/72, 73, 580, 426/583, 34, 36, 38, 74, 518, 519, 582, 335, 532, 654

(56) References Cited

U.S. PATENT DOCUMENTS

| | | |
|---|---|---|
| 5,304,055 A | 4/1994 | Van Lengerich et al. |
| 5,435,714 A | 7/1995 | Van Lengerich et al. |
| 5,626,893 A | 5/1997 | Reddy |
| 5,646,045 A | 7/1997 | Ang |
| 5,665,414 A | 9/1997 | Sherwood et al. |
| 5,876,770 A | 3/1999 | Zaikos et al. |
| 5,985,349 A | 11/1999 | West et al. |
| 6,090,417 A * | 7/2000 | Mehnert et al. .............. 426/72 |

* cited by examiner

Primary Examiner—Leslie Wong
(74) Attorney, Agent, or Firm—Fitch, Even, Tabin & Flannery

(57) ABSTRACT

A method of making flavorful, organoleptically pleasing, non-agglomerating, shredded natural cheese containing one or more nutritional supplements is provided. The method includes the steps of: (1) shredding a natural cheese to form pieces; (2) adding a nutritional supplement nutritional supplement comprising calcium sulfate dihydrate to the shredded cheese to form a mixture; (3) blending the mixture to achieve an essentially homogenous shredded cheese; and (4) packaging the essentially homogenous shredded cheese; wherein the calcium sulfate dihydrate is added in an amount sufficient to provide nutritionally supplementation and to provide non-agglomerating properties. The nutritional supplement of this invention allows preparation of shredded cheeses containing significantly reduced levels of conventional anti-caking agents while still maintaining the desired non-agglomerating properties. In some cases, conventional anti-caking agents are essentially eliminated.

19 Claims, 1 Drawing Sheet

SHREDDED CHEESE

FIELD OF THE INVENTION

This invention relates to a method of preparing of preparing improved shredded cheeses, especially improved shredded natural cheeses, with calcium fortification. The shredded cheeses of this invention require less anti-caking agents than conventionally prepared shredded cheeses.

BACKGROUND OF THE INVENTION

Shredded cheese is a growing component the overall cheese market largely because such a product offers the consumer convenience in the preparation of a wide variety of products in the home kitchen. Shredded cheeses, for example, can be used as toppings or ingredients in homemade dishes such as pizzas, casseroles, salads, and the like.

Ideally, shredded cheeses should not agglomerate during storage and use and should provide melting characteristics and other organoleptic properties similar to their counterpart non-shredded cheeses. Unfortunately, to provide a non-agglomerating shredded cheese it is usually necessary to incorporate significant amounts of anti-caking agent in the shredded cheese. Generally, the amount of anti-caking agent used in conventional shredded cheeses is greater than about 2 percent, and more often in the range of about 2 to about 4 percent. Such anti-caking agents generally have adverse effects on melting and other organoleptic properties. For example, excess anti-caking agents tend to restrict melt characteristics or to cause excessive browning when melted, both of which are perceived negatively by the consumer. Additionally, many anti-caking agents also impart an undesirable gritty texture to the shredded cheese product. Often the anti-caking agents appear as white flecks or particulates on the cheese surfaces. Such white flecks are often mistaken as mold growth by the consumer.

The most common anti-caking agents are cellulose-based products or formulations. Efforts to solve the problems associated with anti-caking agents have generally involved modified anti-caking agents. For example, U.S. Pat. No. 5,626,893 (May 6, 1997) provided an anti-caking agent formulated from fine mesh vegetable flour, bentonite, cellulose, and antimycotic agents or bacterial cultures. This anti-caking agent reportedly reduces the stickiness of the chunked, diced, or shredded cheese, improves the functionality of the cheese, and reduces yeast and/or mold growth.

Generally, another important objective of food products manufactured for public consumption is the enhancement of their nutritional properties while preserving their organoleptic properties. Nutritional fortification of cheese products may include supplementation with trace requirements or additives that benefit the overall state of health of the human body. Examples of nutritional fortification include supplementation by vitamins, minerals, and comparable materials. These supplements are either absolutely essential for human metabolism or enhance the provision of substances that may not be available in sufficient amounts in a normal diet.

Considerable research has been directed to nutritional fortification of foods, including cheeses. It has now been surprising found that calcium fortification of shredded cheese allows for significantly reduced levels, and in some case elimination, of anti-caking agents in shredded cheeses. Using the process of this invention, shredded cheeses with desired non-agglomeration properties, excellent organoleptic properties, and improved nutritional properties can be prepared.

SUMMARY OF THE INVENTION

The present invention provides a method of making flavorful, organoleptically pleasing, non-agglomerating, shredded natural cheese containing one or more nutritional supplements. The method includes the steps of:

(1) shredding a natural cheese to form pieces;

(2) adding a nutritional supplement nutritional supplement comprising calcium sulfate dihydrate to the shredded cheese to form a mixture;

(3) blending the mixture to achieve an essentially homogenous shredded cheese; and (4) packaging the essentially homogenous shredded cheese;

wherein the calcium sulfate dihydrate is added in an amount sufficient to provide nutritionally supplementation and to provide non-agglomerating properties. The use of the nutritional supplement of this invention allows preparation of shredded cheeses containing significantly reduced levels of conventional anti-caking agents while still maintaining the desired non-agglomerating properties. In some cases, conventional anti-caking agents are essentially eliminated.

Also provided is a flavorful, organoleptically pleasing, non-agglomerating shredded natural cheese containing a nutritional supplement, said natural cheese prepared by method comprising the steps of:

(1) shredding a natural cheese to form pieces;

(2) adding a nutritional supplement comprising calcium sulfate to the shredded cheese to form a mixture;

(3) blending the mixture to achieve an essentially homogenous shredded cheese; and (4) packaging the essentially homogenous shredded cheese;

wherein the calcium sulfate dihydrate is added in an amount sufficient to provide nutritionally supplementation and to provide non-agglomerating properties.

The nutritional supplement of the present invention includes calcium sulfate dihydrate in an amount sufficient to significantly reduce the amount of conventional anti-caking agent required to provide a non-agglomerating, shredded cheese. Preferably, the amount of calcium sulfate dihydrate applied is sufficient to eliminate the need for conventional anti-caking agents. More preferably, the amount the amount of calcium sulfate dihydrate applied is also sufficient to provide a desirable level of calcium fortification to the shredded cheese product. Preferably, the amount of calcium fortification is sufficient to provide at least about 500 mg Ca per 30 grams serving size. In an especially preferred embodiment, the shredded cheese of the present invention provides at least about 500 mg Ca per 30 grams serving size and contains natamycin as a mold inhibitor.

The nutritional supplement may also include vitamins, minerals, antioxidants, probiotics, botanicals, and mixtures thereof. Suitable vitamins include, for example, vitamin A, vitamin C, vitamin D, vitamin E, B vitamins, niacin, folate, folic acid, and the like as well as mixtures thereof. Suitable minerals include, for example, salts of metal nutrients, wherein the metals are chosen from among calcium, magnesium, copper, iron, zinc, chromium, and the like as wells as mixtures thereof; salts of inorganic minerals such as, for example, phosphate, sulfate, chloride, and the like as well as mixtures thereof can also be used. Suitable antioxidants include, for example propyl gallate, octyl gallate, dodecyl gallate, butylated hydroxyanisole, butylated hydroxytoluene, and the like as well as mixtures thereof. Suitable probiotics include, for example *Acidophilus Bifidobacterium, Lacotbacilus Johnsonii*, and the like as well as mixtures thereof. Suitable botanicals include, for example St. John wort, ginseng, ginkgo bibba, and the like as well as mixtures thereof. Of course, as those skilled in the art will realize, other vitamins, minerals, antioxidants, probiotics, and botanicals can also be used in the present invention. In additional embodiments, the natural cheese is chosen from among Cheddar cheese, Colby cheese, Monterey jack, Havarti cheese, uenster cheese, Brick cheese, Gouda cheese, and mixtures thereof.

DETAILED DESCRIPTION OF THE INVENTION

Figure 1:
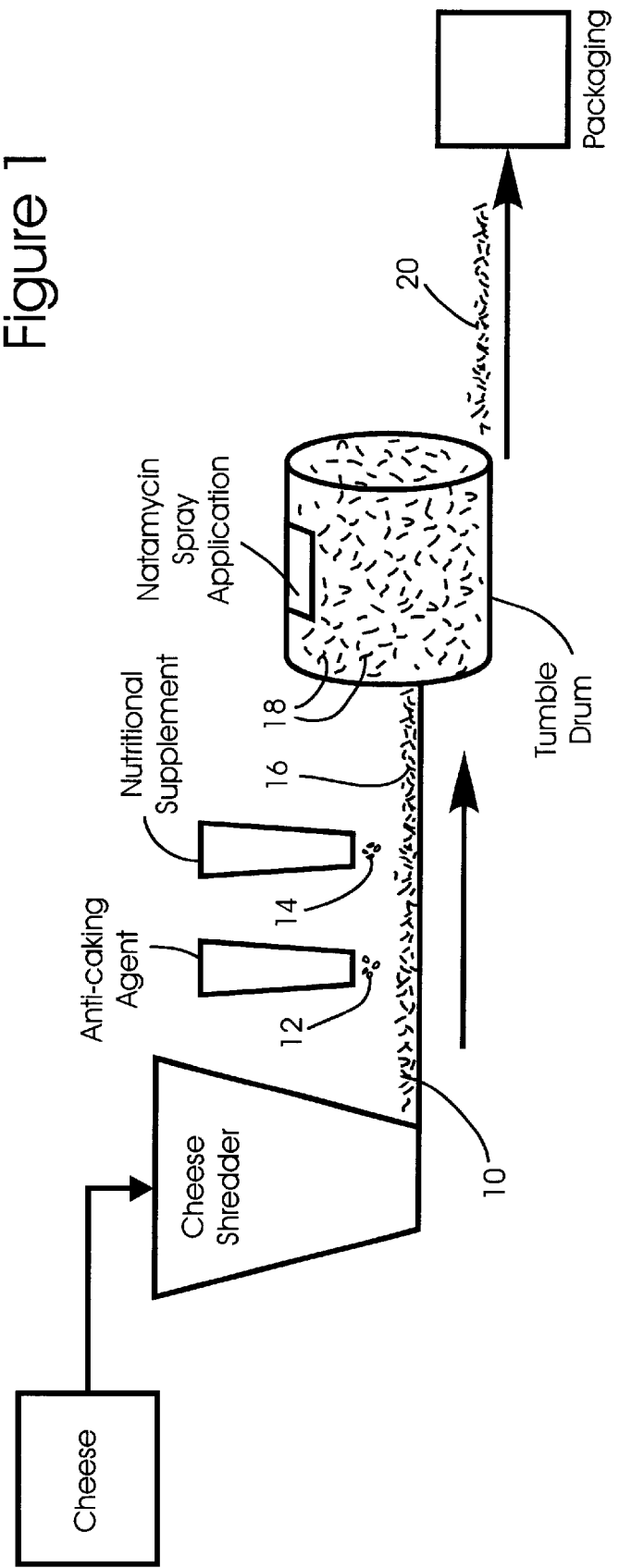
FIG. 1 illustrates a preferred process for the practice of this invention wherein anti-caking agent, nutritional supplement, and natamycin are incorporated in the shredded cheese.

The present invention provides a method of making a flavorful, organoleptically pleasing, non-agglomerating shredded natural cheese containing a nutritional supplement. The nutritional supplement contains calcium sulfate dihydrate which acts both to provide calcium fortification and to significantly reduce the amount of conventional anti-caking agents required to provide the desired non-agglomerating effect. In this method, the nutritional supplement is incorporated directly into the shredded natural cheese. The natural cheese is prepared using conventional cheese-making techniques; shredding is also carried out using conventional techniques.

The natural cheeses employed in the method may be derived from the treatment of any dairy liquid that provides cheese curds upon renneting. Such liquids include whole milk, reduced fat milk, skim milk, and any such milk further containing added dairy fractions. Such dairy fractions may be chosen by way of nonlimiting example from cream fractions, concentrated milk fractions obtained for example by evaporation, diafiltration and/or ultrafiltration of milk, and comparably treated dairy liquids. The dairy liquid employed in the cheese making fermentation may further contain dried solid components of milk fractions, such as non fat dry milk, cream solids, and the like.

The dairy liquid so provided is subjected to a conventional cheese making process. The cheese may be produced by treatment with a rennet, a cheesemaking culture, or a combination thereof. When a cheesemaking culture is employed, the identity of the resulting cheese, and its characteristic flavor, texture and mouthfeel are governed by the particular culture chosen for the fermentation. In this way, a broad range of natural cheeses may be produced for use in the present invention. These cheeses include, by way of nonlimiting example, Cheddar cheese, Colby cheese, Monterey Jack, Havarti cheese, Muenster cheese, Brick cheese, Gouda cheese, and the like. Mixtures of such cheeses may also be used.

The natural cheese is then shredded to form pieces whose sizes are (1) suitable for shredded cheese and (2) appropriate for receiving the nutritional supplement. In general, cheese fragments used in the present invention may be regular or irregular sized shreds or particles; regular sized shreds or particles are preferred. The size of the shredded pieces can vary widely but are generally about 1/32 to about 3/8 inches in diameter and about 0.75 to about 3 inches in length; more preferably, they are about 1/16 to about 1/8 inches in diameter and about 1 to about 2 inches in length. Of course, other shaped particles having similar dimensions to those just discussed can be used in the practice of this invention. The size of the fragments is appropriate to receive the nutritional supplement if, after adding the supplement, the mixture may be blended to distribute the supplement essentially uniformly throughout the blended mixture.

A composition comprising the nutritional supplement is added to the shredded cheese. The composition may be a solid blend of the nutritional compounds, or it may be a suspension or solution of the nutrient compounds in a liquid. The liquid may be an aqueous composition or an organic liquid such as a fat or oil, or a volatile edible solvent such as ethanol. In addition to the calcium sulfate dihydrate, the nutritional supplement may also contain other ingredients or nutrients, including, for example, vitamins, minerals, antioxidants, probiotics, botanicals, and mixtures thereof. Such additional nutrients that may be included in the supplement generally are trace nutrients that are either required for metabolism of the cells of the human body, or they may be substances which are available at moderate levels in ordinary foodstuffs but which may be supplemented by inclusion in the nutritional supplement of the invention. As used herein, a "trace" nutrient is any nutrient whose total daily required intake for an adult human is less than about 1–2 gram, or in many cases, less than about 100 mg, or even in certain cases less than 10 mg, or less than 1 mg. The composition may further contain inert and nutritionally innocuous extenders or excipients whose presence helps achieve a uniform distribution of the nutritionally active compounds in the supplement composition, once added to the cheese, throughout the blended mixture. Generally, the nutritional supplement contains at least about 1.2 percent calcium sulfate dihydrate, more preferably about 1.2 to about 6 percent calcium sulfate dihydrate, and most preferably about 4 to about 6 percent calcium sulfate dihydrate. If desired, the nutritional supplement may contain only calcium sulfate dihydrate. Generally, however, other nutrients are preferably included in the shredded cheeses of this invention.

The other nutrient compounds included in the nutritional supplements of the invention include, for example, vitamins, minerals, antioxidants, probiotics, botanicals, and mixtures thereof. Suitable vitamins include, for example, vitamin A, vitamin C, vitamin D, vitamin E, B vitamins, niacin, folate, folic acid, and the like as well as mixtures thereof. Suitable minerals include, for example, salts of metal nutrients, wherein the metals are chosen from among calcium, magnesium, copper, iron, zinc, chromium, and the like as wells as mixtures thereof; salts of inorganic minerals such as, for example, phosphate, sulfate, chloride, and the like as well as mixtures thereof can also be used. Suitable antioxidants include, for example propyl gallate, octyl gallate, dodecyl gallate, butylated hydroxyanisole, butylated hydroxytoluene, and the like as well as mixtures thereof. Suitable probiotics include, for example *Acidophilus Bifidobactedum, Lacotbacilus Johnsonii*, and the like as well as mixtures thereof. Suitable botanicals include, for example St. John wort, ginseng, ginkgo bibba, and the like as well as mixtures thereof. Of course, as those skilled in the art will realize, other vitamins, minerals, antioxidants, probiotics, and botanicals can also be used in the present invention.

The nutritional supplements of this invention contain, as the major component, calcium sulfate dihydrate. The amount of the other components included in the nutritional supplements can, of course, vary considerably depending on the specific nutrient or mineral added (and its recommended daily requirement) and the targeted consumer. For example, macronuterients can be added at relatively high levels (i.e., up to about 5 percent based on the weight of the shredded cheese) whereas other trace minerals, vitamins, and other additives (i.e., generally materials having daily adult requirements in the milligram range or lower) will normally be added at much lower levels. It is generally suggested that such additives be incorporated such that a single serving size (generally about 30 grams) of the fortified shredded cheese will provide about 10 to about 100 percent of the recommended daily requirement. As those skilled in the art will realize, lower or higher amounts can also be used taking into account the nutritional requirements of consumers.

The nutritional supplement for use in the present invention contains calcium in the form of calcium sulfate dihydrate. Other suitable forms of calcium that may be incorporated through the nutritional supplement include, for example, calcium chloride, monocalcium phosphate, tricalcium phosphate, calcium carbonate, and the like, as well as mixtures thereof.

An especially preferred nutritional supplement mixture for use in this invention includes calcium sulfate dihydrate and natamycin (a mold inhibitor). Preferably, the final shredded cheese product supplemented with such a mixture will contain about 3 to about 5 weight percent calcium and about 1 to 1.5 percent natamycin. Of course, smaller or larger amounts can be used if desired. Generally, such a shredded cheese will allow a reduction of at least 25 percent, and preferably about 25 to about 50 percent, in the amount of conventional anti-caking agents (i.e., cellulose based anti-caking agents) required to provide a non-agglomerating shredded cheese.

In operation, the nutritional supplement composition can be added to the cheese shreds in, for example, a tumble drum mixer. A liquid nutritional composition may be added, for example, using a sprayer or an atomizer, or it may be added dropwise from a nozzle. For liquid nutritional compositions, the concentration of the nutritional additives will generally vary depending on the number of and the actual nutritional additives included in addition to the calcium sulfate dihydrate. A solid nutritional composition may be added as a particulate mixture or blend of the components using conventional devices that can supply a uniform rate of the composition. For solid nutritional compositions, the particle size is generally in the range of about 5 to about 50 microns. Of course, other methods of introducing the supplements can be used so long as they can be effectively distributed over the surfaces of the shredded cheese particles. The drum revolves slowly such that the shredded cheese and the nutritional supplement are blended together in a uniform fashion. Of course, other types of mixer can be used if desired; such mixers include, for example, single screw augers, V-blenders, and the like.

A preferred process for the preparation of the shredded cheeses of this invention is illustrated in FIG. 1. Natural cheese is fed into a cheese shredder to form shredded cheese 10. Both anti-caking agent 10 and nutritional supplement 14, both preferably in solid form, are applied from their respective feeders as the shredded cheese 10 moves along a conveyor belt. In some cases, it may be preferred that no anti-caking agent is used; in all cases, the amount of anti-caking agent required is significantly less than the amounts used to prepare conventional shredded cheese. The resulting mixture 16 is then fed into a tumble drum where natamycin is applied using a spray applicator. Within the tumble drum, the cheese shreds 18 are uniformly coated with the various components.

The treated cheese shreds 20 are then sent to a packaging station for packaging for the wholesale or retail markets as appropriate. Once blended, the fortified cheese fragments are packaged using conventional packaging techniques. Preferably, shredded cheeses of this invention for the retail market are packaged in reclosable or resealable plastic packages.

We claim:

1. A method for preparing a flavorful, organoleptically pleasing, non-agglomerating, shredded natural cheese containing one or more nutritional supplements, said method comprising:
   (1) shredding a natural cheese to form pieces;
   (2) adding a nutritional supplement comprising calcium sulfate dihydrate to the shredded cheese to form a mixture;
   (3) blending the mixture to achieve an essentially homogenous shredded cheese; and
   (4) packaging the essentially homogenous shredded cheese;
   wherein the calcium sulfate dihydrate is added in an amount sufficient to provide nutritionally supplementation and to provide non-agglomerating properties.

2. The method as defined in claim 1, wherein the nutritional supplement further comprises vitamins, minerals, antioxidants, probiotics, botanicals, or mixtures thereof.

3. The method as defined in claim 1, wherein the nutritional supplement further comprises vitamins chosen from the group consisting of vitamin A, vitamin C, vitamin D, vitamin E, B vitamins, niacin, folate, folic acid, and mixtures thereof.

4. The method as defined in claim 1, wherein the nutritional supplement further comprises minerals selected from the group of salts of metal nutrients and salts of inorganic nutrients.

5. The method as defined in claim 1, wherein the nutritional supplement further comprises salts of metal nutrients, wherein the metal is selected from the group consisting of calcium, magnesium, copper, iron, zinc, chromium, and mixtures thereof.

6. The method as defined in claim 1, wherein the nutritional supplement comprises salts of inorganic nutrients selected from the group consisting of phosphate, sulfate, chloride, and mixtures thereof.

7. The method as defined in claim 1, wherein the natural cheese is chosen from the group consisting of Cheddar cheese, Colby cheese, Monterey Jack, Havarti cheese, Muenster cheese, Brick cheese, Gouda cheese, and mixtures thereof.

8. The method as defined in claim 1, wherein an anti-caking agent is also applied to the shredded cheese.

9. The method as defined in claim 1, wherein natamycin is also applied to the shredded cheese.

10. The method as defined in claim 8, wherein natamycin is also applied to the shredded cheese.

11. The method as defined in claim 9, wherein the homogenous shredded cheese contains sufficient calcium sulfate dihydrate to provide about 3 to about 5 percent calcium and wherein the homogenous shredded cheese contains about 1 to 1.5 percent natamycin.

12. The method as defined in claim 10, wherein the homogenous shredded cheese contains sufficient calcium sulfate dihydrate to provide about 3 to about 5 percent calcium and wherein the homogenous shredded cheese contains about 1 to 1.5 percent natamycin.

13. A flavorful, organoleptically pleasing, non-agglomerating shredded natural cheese containing a nutritional supplement, said shredded natural cheese prepared by method comprising:
   (1) shredding a natural cheese to form pieces;
   (2) adding a nutritional supplement comprising calcium sulfate dihydrate to the shredded cheese to form a mixture;
   (3) blending the mixture to achieve an essentially homogenous shredded cheese; and (4) packaging the essentially homogenous shredded cheese;

wherein the calcium sulfate dihydrate is added in an amount sufficient to provide nutritionally supplementation and to provide non-agglomerating properties.

14. The shredded natural cheese as defined in claim 13, wherein the natural cheese is chosen from the group consisting of Cheddar cheese, Colby cheese, Monterey Jack, Havarti cheese, Muenster cheese, Brick cheese, Gouda cheese, and mixtures thereof.

15. The shredded natural cheese as defined in claim 14, wherein an anti-caking agent is also applied to the shredded cheese.

16. The method as defined in claim 14, wherein natamycin is also applied to the shredded cheese.

17. The shredded natural cheese as defined in claim 15, wherein natamycin is also applied to the shredded cheese.

18. The shredded natural cheese as defined in claim 16, wherein the homogenous shredded cheese contains sufficient calcium sulfate dihydrate to provide about 3 to about 5 percent calcium and wherein the homogenous shredded cheese contains about 1 to 1.5 percent natamycin.

19. The shredded natural cheese as defined in claim 17, wherein the homogenous shredded cheese contains sufficient calcium sulfate dihydrate to provide about 3 to about 5 percent calcium and wherein the homogenous shredded cheese contains about 1 to 1.5 percent natamycin.

* * * * *